United States Patent
Lesarte et al.

(10) Patent No.: US 6,944,714 B2
(45) Date of Patent: Sep. 13, 2005

(54) METHOD AND APPARATUS FOR SAVING MICROPROCESSOR POWER WHEN SEQUENTIALLY ACCESSING THE MICROPROCESSOR'S INSTRUCTION CACHE

(75) Inventors: Gregg B. Lesarte, Fort Collins, CO (US); John W. Bockhaus, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 411 days.

(21) Appl. No.: 10/209,473

(22) Filed: Jul. 30, 2002

(65) Prior Publication Data

US 2004/0024968 A1 Feb. 5, 2004

(51) Int. Cl.$^7$ ............................................... G06F 12/00
(52) U.S. Cl. ....................... 711/128; 711/104; 711/105; 711/118; 711/136; 711/156; 711/160; 713/300; 713/320; 713/321; 713/322; 713/323; 713/324; 365/49; 365/189.05; 365/189.07; 365/203; 365/226; 365/227; 365/230.06; 365/230.09
(58) Field of Search ................................. 711/104, 105, 711/118, 128, 136, 156, 160; 713/300, 320, 321, 322, 323, 324; 365/49, 189.05, 189.07, 203, 226, 227, 230.06, 230.09

(56) References Cited

U.S. PATENT DOCUMENTS 6,076,140 A * 6/2000 Dhong et al. ............... 711/105

2002/0112126 A1 * 8/2002 Hayakawa et al. ......... 711/128
2004/0010675 A1 * 1/2004 Moritz ....................... 711/202

OTHER PUBLICATIONS

Ma et al., "Way Memoization to Reduce Fetch Energy in Instruction Cache," Workshop on Complexity–Effective Design, in conjunction with ISCA–28, Jun. 2001.*

Powell et al., "Reducing Set–Associative Cache Energy via Way–Prediction and Selective Direct–Mapping," MICRO'34, 2001.*

Kang et al., "CMOS Digital Integrated Circuits Analysis and Design," McGraw–Hill, Second Edition, 1999, pp. 437–444.*

* cited by examiner

*Primary Examiner*—Donald Sparks
(74) *Attorney, Agent, or Firm*—John Pessetto

(57) ABSTRACT

An embodiment of the invention provides a circuit and method for reducing power in multi-way set associative arrays. A control circuit detects when the next cache access will be taken from the same cache way that the previous cache access was taken from. If the next cache access is taken from the same cache way as the previous cache access, the control circuit signals all the cache ways, except the cache way that was previously accessed, to not access information from their arrays. The control circuit also signals the tag arrays to not access their information and disables power to all the compare circuits. In this manner, power may be reduced when sequentially accessing information from one cache way in a multi-way set associative array.

9 Claims, 3 Drawing Sheets

METHOD AND APPARATUS FOR SAVING MICROPROCESSOR POWER WHEN SEQUENTIALLY ACCESSING THE MICROPROCESSOR'S INSTRUCTION CACHE

FIELD OF THE INVENTION

This invention relates generally to microprocessor power. More particularly, this invention relates to reducing power in a microprocessor when sequentially accessing the microprocessor's instruction cache.

BACKGROUND OF THE INVENTION

As more electronic circuits are included on a single die, the power dissipated by a single die continues to increase. In order to keep the temperature of a single IC (integrated circuit) at a reasonable temperature, many techniques have been used. For example, elaborate cooling fins have been attached to the substrate of ICs. Also, fans have been positioned near a group of IC's to cool them. In some cases, liquids have been used to transfer the heat produced by ICs. These solutions can be costly and may require a great deal of space, where space is at a premium.

In addition, the cost to air condition rooms where many computers are stored can be costly. Another problem created by ICs consuming more and more power is that in some cases not enough power can be supplied to a computer system through a single-phase power source. In order to supply enough current for this type of computer system, more costly three-phase power is required. If the power used by ICs can be reduced while still achieving higher levels of integration, the cost and area of devices that use ICs may be reduced.

As the size of microprocessors continues to grow, the size of the cache memory that is often included on a microprocessor chip may grow as well. In some applications, cache memory may utilize more than half the physical size of a microprocessor. As cache memory grows so does power consumption.

On-chip cache memory on a microprocessor is usually divided into groups: one group stores data and another group stores instructions. The group that stores data is usually called a data cache (dcache). The group that stores instructions is usually called an instruction cache (icache).

There is a need in the art to reduce the power consumed on microprocessors. An embodiment of this invention specifically addresses power consumption in a microprocessor's instruction cache. In order to provide a sufficient supply of instructions to a modern super-scalar processor, the processor's instruction cache is typically accessed every cycle. For a first level cache access, an access typically requires accessing multiple cache ways along with their tags. The tags are compared to the access address to determine which cache way has the correct information, and then the correct information is forwarded to the execute engine of the microprocessor. The cache ways that did not have the correct information were still accessed, but their instructions were not used. This type of aggressive implementation consumes significant power on a microprocessor.

One embodiment of this invention reduces the power consumed by a multiple-way instruction cache by monitoring when the next icache instruction is guaranteed to be in the same cache line and thus the same cache way as the current access. When the next icache instruction is in the same cache line as the current access, control logic signals all other cache ways to not access their information. By not accessing information from the cache ways that don't contain the required cache line, power is reduced. A detailed description of one embodiment of this invention is described later.

SUMMARY OF THE INVENTION

An embodiment of the invention provides a circuit and method for reducing power in multi-way set associative arrays. A control circuit detects when the next cache access will be taken from the same cache way that the previous cache access was taken from. If the next cache access is taken from the same cache way as the previous cache access, the control circuit signals all the cache ways, except the cache way that was previously accessed, to not access information from their arrays. The control circuit also signals the tag arrays to not access their information and disables power to all the compare circuits. In this manner, power may be reduced when sequentially accessing information from one cache way in a multi-way set associative array.

Other aspects and advantages of the present invention will become apparent from the following detailed description, taken in conjunction with the accompanying drawings, illustrating by way of example the principles of the invention.

DETAILED DESCRIPTION OF THE PREFERRED EMBODIMENT

Figure 1:
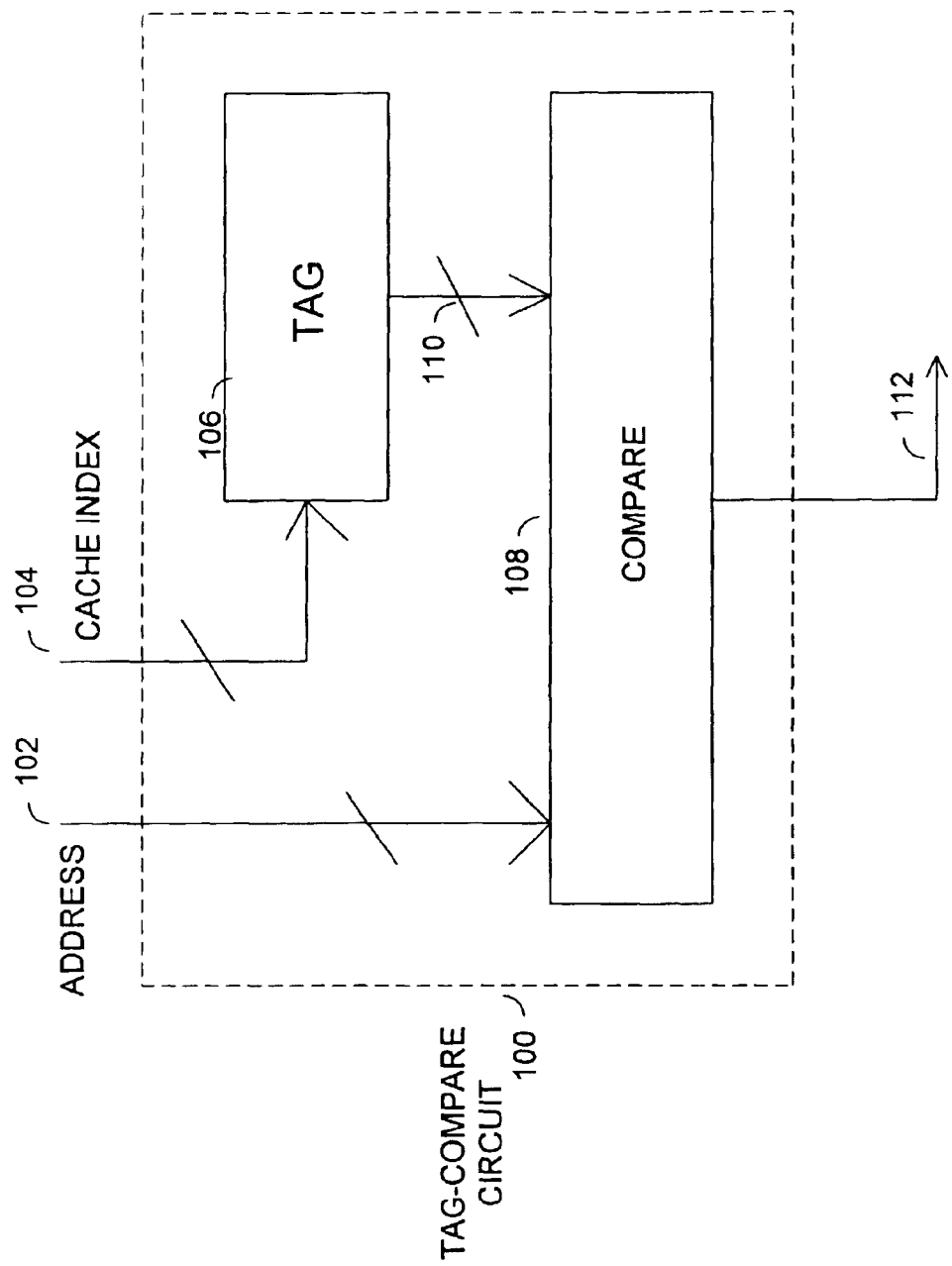
FIG. 1 is a block diagram of a tag-compare circuit. Prior Art
Figure 2:
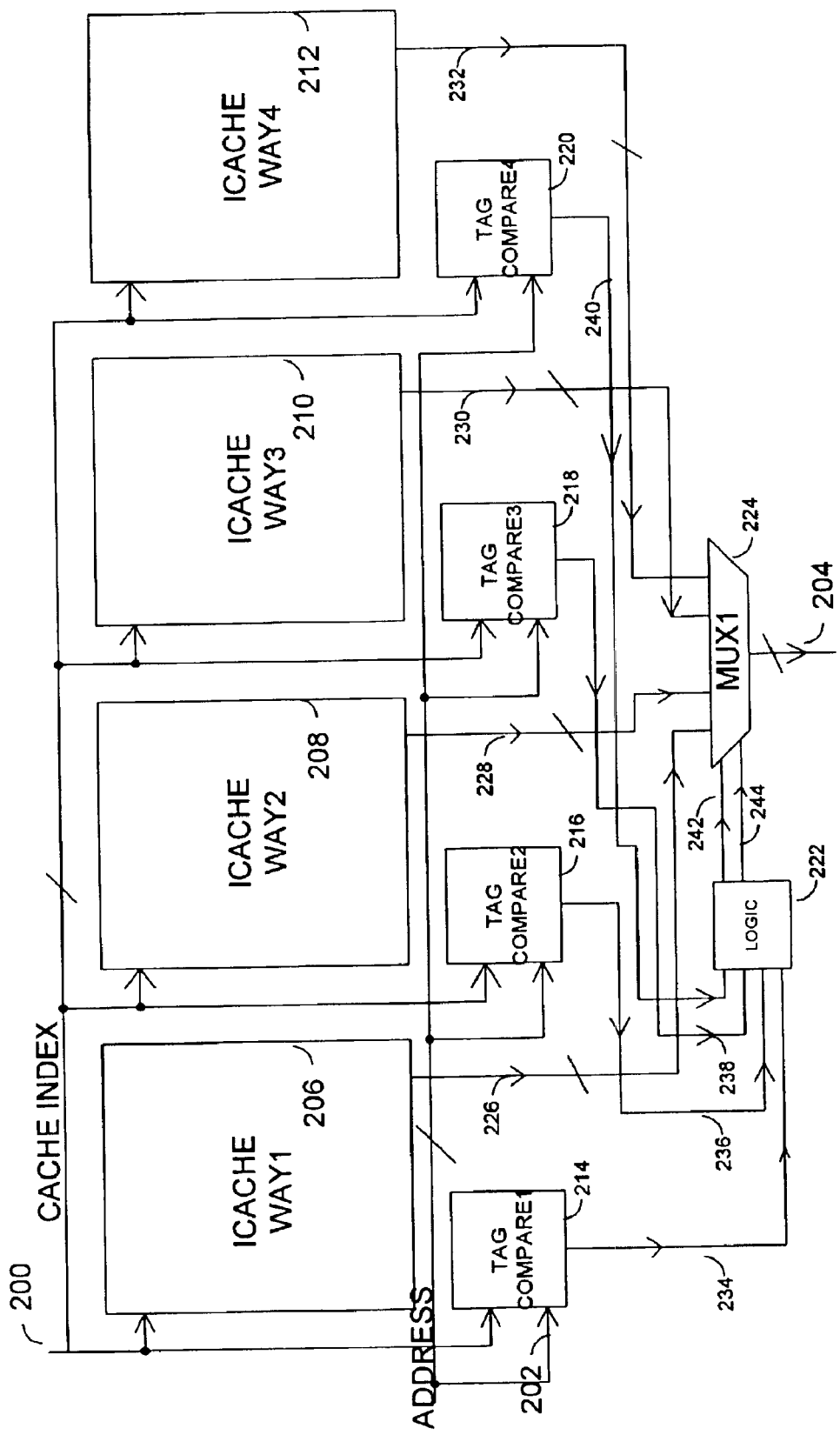
FIG. 2 is a block diagram of a four-way set associative instruction cache array. Prior Art FIG. 3 a block diagram of a four-way set associative instruction cache array with a power saving control block.

FIG. 1 is a block diagram of a tag-compare circuit, 100, containing a tag RAM (random access memory), 106, and a compare circuit, 108. A cache index, 104, is sent to the tag RAM, 106 where the cache index, 104, references an address, 110. The address from the tag RAM, 110, is then sent to the compare circuit, 108. The compare circuit, 108, compares the current address, 102, with the address, 110, taken from the tag RAM, 106. If the two addresses, 110 and 102, match, the compare-circuit, 108, sends a signal indicating a match. The tag-compare circuit, 100, is used in FIG. 2. Only the inputs and outputs of the tag-compare circuit, 100 are shown in FIG. 2 in order to make FIG. 2 easier to follow. The tag-compare circuit in FIG. 2 retains all the features described in FIG. 1.

FIG. 2 shows a diagram of the functional structure of a four-way set associative instruction cache array. The four-way set associative instruction cache array contains four icache ways, 206, 208, 210, and 212. The four-way set associative instruction cache array also contains four tag-compare circuits, 214, 216, 218, and 220, along with a logic circuit, 222 and a four-way multiplexer, 224.

A cache index, 200, is sent to each of the icache ways, 206, 208, 210, and 212 and to each of the tag-compare circuits, 214, 216, 218, and 220. Each icache way, 206, 208, 210, and 212 outputs an instruction word, 226, 228, 230, and 232 respectively that corresponds to the cache index, 200, presented. The instruction words, 226, 228, 230, and 232 are actively driven to inputs of the four-way multiplexer, 224.

An address, 202, is sent to each of the tag-compare circuits, 214, 216, 218, and 220. Each of the tag-compare circuits, 214, 216, 218, and 220 compare the address generated by the cache index, 200, to the address, 202. Each of the tag-compare circuits, 214, 216, 218, and 220, sends a signal, 234, 236, 238, and 240 respectively, to the logic circuit, 222, indicating whether they have a match or not. The logic circuit, 222, based on which tag-compare matches, sends a signals, 242 and 244, to the multiplexer, 224. The signals sent to the multiplexer, 224, determine which of the four inputs, 226, 228, 230, and 232, are connected to the output, 204, of the multiplexer, 224.

The output, 204, of the multiplexer, 224 may be a subset of a cache line. As a result, the four-way set associative array shown in FIG. 2, may need to cycle multiple times in order to provide enough information to create a complete cache line. If the instructions in these multiple cycles are all part of the same cache line, the output, 204, of the multiplexer, during these multiple cycles will originate from only one of the icache ways, 206, 208, 210, or 212. However, all four icache ways, 206, 208, 210, and 212, and all four tag-compare circuits, 214, 216, 218, and 220, are active, even though information from only one icache way and only one tag-compare is used each cycle. The power used to access information from the three icache ways and the three tag-compares that are not used is wasted. If it was known ahead of time which icache way and associated tag-compare circuit were to be used, power could be saved by not accessing unused information from the other three icache ways and associated tag-compare circuits.

One aspect of this invention reduces the power consumed by a multi-way set associative instruction cache by taking advantage of a typical pattern of access into an icache. Instructions are typically accessed sequentially, until a branch is encountered. As a consequence, information is taken from only one icache way for a number of cycles. Because information during this period is taken from only one icache way, the other cache ways do not need to be accessed. This invention takes advantage of this situation by not accessing information from the caches not being used and as a result, reduces the power consumed by a multi-way set associative icache.

This invention includes logic in the processor's instruction fetch control block, which detects when the next cache access is guaranteed to be in the same icache way as the current access. When this is the case, the fetch control block signals to the instruction cache that it should repeat a cache hit from the same icache way indicated previously, disable access of the instruction tag cache ram currently used, and disable access of information from the unneeded icache ways and tag rams.

Figure 3:
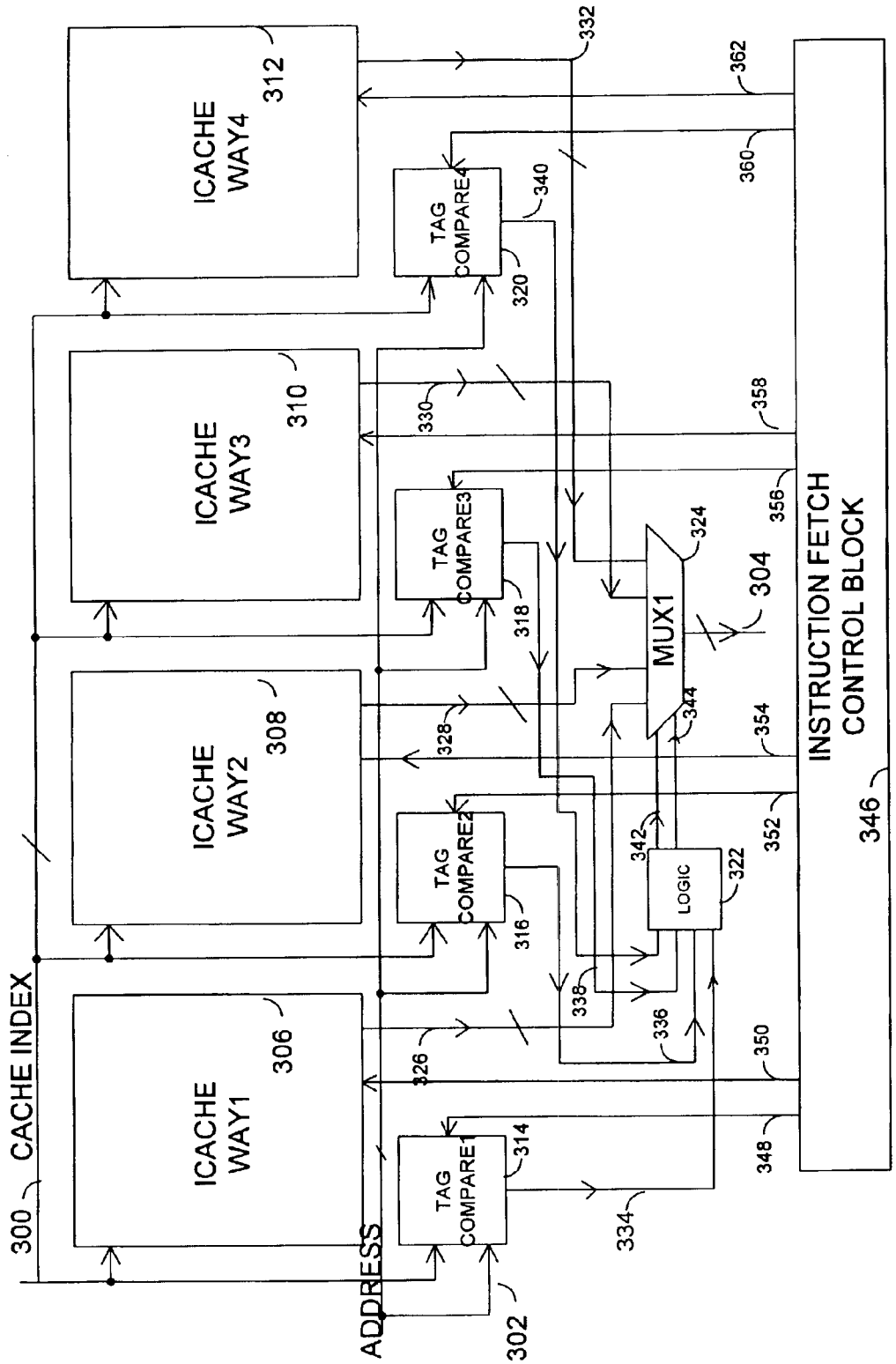

FIG. 3 shows a diagram of the functional structure of a four-way set associative instruction cache array that reduces power over standard four-way set associative instruction caches. The four-way set associative instruction cache array contains four icache ways, 306, 308, 310, and 312. The four-way set associative instruction cache array also contains four tag-compare circuits, 314, 316, 318, and 320, along with a logic circuit, 322 and a four-way multiplexer, 324.

A cache index, 300, is sent to each of the icache ways, 306, 308, 310, and 312 and to each of the tag-compare circuits, 314, 316, 318, and 320. Each icache way, 306, 308, 310, and 312 outputs an instruction word, 326, 328, 330, and 332 respectively that corresponds to the cache index, 300, presented, unless the instruction fetch control block, 346 indicates they should not be accessed. The instruction words, 326, 328, 330, and 332 are actively driven to inputs of the four-way multiplexer, 324 unless a signal, 350, 354, 358, or 362, indicates an icache way should not be assessed.

An address, 302, is sent to each of the tag-compare circuits, 314, 316, 318, and 320. Each of the tag-compare circuits, 314, 316, 318, and 320 compare the address generated by the cache index, 300, to the address, 302. Each of the tag-compare circuits, 314, 316, 318, and 320, sends a signal, 334, 336, 338, and 340 respectively, to the logic circuit, 322, indicating whether they have a match or not, unless the instruction fetch control block, 346, indicates they should not be accessed. The logic circuit, 322, based on which tag-compare matches, sends a signals, 342 and 344, to the multiplexer, 324. The signals sent to the multiplexer, 324, determine which of the four inputs, 326, 328, 330, and 332, are connected to the output, 304, of the multiplexer, 324.

If the instruction fetch control block, 346, detects that the next access is going to read from the same icache way as the previous access, the instruction fetch control block, 346, will signal all tag-compares, tag-arrays, and three icache ways not to be accessed. For example, if the instruction fetch control block, 346, indicates that the next access is going to read from the same way as the previous access, 306 and icache way1, 306 was accessed on the previous access, the instruction fetch control block, 346, will signal, through lines, 348, 352, 356, and 360, tag-compare circuirts, 314, 316, 318, and 320, not to access information. In addition, the instruction fetch control block, 346, will signal through lines, 354, 358, and 362, icache ways, 308, 310, and 312, not to access their information. These circuits will not be accessed until the instruction fetch control block, 346, indicates otherwise.

When a branch occurs, the next instruction is not guaranteed to be in the current icache way; as a result, the instruction fetch control block, 346, will instruct all icache ways, 306, 308, 310, and 312, and all tag-compare circuits, 314, 316, 318, and 320 to access information. All the icache ways and tag-compare circuits will continue to access information and as result, use more power, until the instruction fetch control block encounters another condition where consecutive accesses originate from the same icache way.

The example shown in FIG. 3 illustrates a four-way set associative array. This invention is not limited to a four-way set associative array. This invention applies to any multiple ways icache where several accesses are required to form a full cache line.

The foregoing description of the present invention has been presented for purposes of illustration and description. It is not intended to be exhaustive or to limit the invention to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments of the invention except insofar as limited by the prior art.

What is claimed is:

1. A circuit for reducing power in multi-way set associative arrays comprising:
    (a) a logic circuit that detects when a next cache access will occur in a same cache way as a current cache access;

(b) a plurality of cache ways;
(c) a plurality of tag arrays;
(d) a plurality of compare circuits;
(e) wherein said logic circuit signals all said cache ways, except said same cache way, to not access information from all said cache ways except said same cache way;
(f) wherein said logic circuit signals all said tag arrays to not access information from said tag arrays;
(g) wherein said logic circuit disables power to all said compare circuits.

2. A circuit for reducing power in multi-way set associative arrays comprising:
(a) a logic circuit that detects when a next cache access will occur in a same cache way as a current cache access;
(b) a plurality of cache ways;
(c) a plurality of tag arrays;
(d) a plurality of compare circuits;
(e) wherein said logic circuit signals all said cache ways, except said same cache way, to halt all clocks contained in all said cache ways except said same cache way;
(f) wherein said logic circuit signals all said tag arrays to not access information from said tag arrays;
(g) wherein said logic circuit disables power to all said compare circuits.

3. A circuit for reducing power in multi-way set associative arrays comprising:
(a) a logic circuit that detects when a next cache access will occur in a same cache way as a current cache access;
(b) a plurality of cache ways;
(c) a plurality of tag arrays;
(d) a plurality of compare circuits;
(e) wherein said logic circuit signals all said cache ways, except said same cache way, to not charge all bitlines in said cache ways except said same cache way;
(f) wherein said logic circuit signals all said tag arrays to not access information from said tag arrays;
(g) wherein said logic circuit disables power to all said compare circuits.

4. A circuit for reducing power in multi-way set associative arrays comprising:
(a) a logic circuit that detects when a next cache access will occur in a same cache way as a current cache access;
(b) a plurality of cache ways;
(c) a plurality of tag arrays;
(d) a plurality of compare circuits;
(e) wherein said logic circuit signals all said cache ways, except said same cache way, to disable power to all sense amps in all said cache ways except said same cache way;
(f) wherein said logic circuit signals all said tag arrays to not access information from said tag arrays;
(g) wherein said logic circuit disables power to all said compare circuits.

5. A circuit for reducing power in multi-way set associative arrays comprising:
(a) a logic circuit that detects when a next cache access will occur in a same cache way as a current cache access;
(b) a plurality of cache ways;
(c) a plurality of tag arrays;
(d) a plurality of compare circuits;
(e) wherein said logic circuit signals all said cache ways, except said same cache way, to not access information from all said cache ways except said same cache way;
(f) wherein said logic circuit signals all said tag arrays to halt all clocks in said tag arrays;
(g) wherein said logic circuit disables power to all said compare circuits.

6. A circuit for reducing power in multi-way set associative arrays comprising:
(a) a logic circuit that detects when a next cache access will occur in a same cache way as a current cache access;
(b) a plurality of cache ways;
(c) a plurality of tag arrays;
(d) a plurality of compare circuits;
(e) wherein said logic circuit signals all said cache ways, except said same cache way, to not access information from all said cache ways except said same cache way;
(f) wherein said logic circuit signals all said tag arrays to not charge all bitlines in said tag arrays;
(g) wherein said logic circuit disables power to all said compare circuits.

7. A circuit for reducing power in multi-way set associative arrays comprising:
(a) a logic circuit that detects when a next cache access will occur in a same cache way as a current cache access;
(b) a plurality of cache ways;
(c) a plurality of tag arrays;
(d) a plurality of compare circuits;
(e) wherein said logic circuit signals all said cache ways, except said same cache way, to not access information from all said cache ways except said same cache way;
(f) wherein said logic circuit signals all said tag arrays to disable power to all sense amps in said tag arrays;
(g) wherein said logic circuit disables power to all said compare circuits.

8. A circuit for reducing power in multi-way set associative arrays comprising:
(a) a means for detecting when a next cache access will occur in a same cache way as a current cache access;
(b) a plurality of cache ways;
(c) a plurality of tag arrays;
(d) a plurality of compare circuits;
(e) wherein said detecting means signals all said cache ways, except said same cache way, to not access information from all said cache ways except said same cache way;
(f) wherein said detecting means signals all said tag arrays to not access information from said tag arrays;
(g) wherein said detecting means disables power to all said compare circuits.

9. A circuit for reducing power in multi-way set associative arrays comprising:
(a) a means for detecting when a next cache access is used to gather additional information for a current cache line;
(b) a plurality of cache ways;

(c) a plurality of tag arrays;
(d) a plurality of compare circuits;
(e) wherein said detecting means signals all said cache ways, except said same cache way, to not access information from all said cache ways except said same cache way;
(f) wherein said detecting means signals all said tag arrays to not access information from said tag arrays;
(g) wherein said detecting means disables power to all said compare circuits.

* * * * *

UNITED STATES PATENT AND TRADEMARK OFFICE
CERTIFICATE OF CORRECTION

PATENT NO. : 6,944,714 B2
APPLICATION NO. : 10/209473
DATED : September 13, 2005
INVENTOR(S) : Gregg B. Lesartre et al.

It is certified that error appears in the above-identified patent and that said Letters Patent is hereby corrected as shown below:

On the title page, item (75), in "Inventors", in column 1, line 1 delete "Gregg B. Lesarte" and insert -- Gregg B. Lesartre --, therefor.

Signed and Sealed this

Fourth Day of August, 2009

JOHN DOLL
*Acting Director of the United States Patent and Trademark Office*